United States Patent [19]
Cardillo et al.

[11] Patent Number: 5,917,408
[45] Date of Patent: *Jun. 29, 1999

[54] MAINTENANCE ALERT CLUSTER WITH MEMORY

[75] Inventors: Alfredo Cardillo, Roseville; Peter Michael Doerr, Flint, both of Mich.

[73] Assignee: Prodesign Technology, Inc., Roseville, Mich.

[ * ] Notice: This patent is subject to a terminal disclaimer.

[21] Appl. No.: 08/820,504

[22] Filed: Apr. 4, 1997

[51] Int. Cl.⁶ .................................................. G08B 19/00
[52] U.S. Cl. ................ 340/439; 340/309.15; 340/457.4; 340/459; 364/424.034
[58] Field of Search .................................. 340/439, 459, 340/457.4, 457, 309.15, 905, 426; 364/550, 478, 510, 424.034, 425; 235/95 R, 95 B, 96

[56] References Cited

U.S. PATENT DOCUMENTS

| | | | |
|---|---|---|---|
| 1,658,069 | 2/1928 | Wood | 235/144 DM |
| 3,583,629 | 6/1971 | Heidel | 235/96 |
| 3,598,309 | 8/1971 | Engler et al. | 235/95 B |
| 3,935,996 | 2/1976 | Kleinbohl | 235/95 R |
| 4,031,363 | 6/1977 | Freeman et al. | 364/424.04 |
| 4,404,641 | 9/1983 | Bazarnik | 364/569 |
| 4,478,521 | 10/1984 | Evans et al. | 368/8 |
| 4,490,798 | 12/1984 | Franks | 340/457.4 |
| 4,591,823 | 5/1986 | Horvat | 340/905 |
| 4,593,263 | 6/1986 | Peckworth | 340/457.4 |
| 4,612,623 | 9/1986 | Bazarnik | 364/569 |
| 4,658,371 | 4/1987 | Walsh et al. | 340/457.4 |
| 4,884,054 | 11/1989 | Moon, Sr. | 340/309 |
| 5,006,829 | 4/1991 | Miyamoto et al. | 340/459 |
| 5,058,044 | 10/1991 | Stewart et al. | 364/551.01 |
| 5,499,181 | 3/1996 | Smith | 364/424.04 |
| 5,557,254 | 9/1996 | Johnson et al. | 340/426 |
| 5,623,247 | 4/1997 | Cardillo | 340/457.4 |

*Primary Examiner*—Edward Lefkowitz
*Assistant Examiner*—Davetta Woods
*Attorney, Agent, or Firm*—Harness, Dickey & Pierce P.L.C.

[57] ABSTRACT

A maintenance alert device having a memory for storing information relating to the vehicle is disclosed. More specifically, a housing is provided for containing the components of the device, which include a processor for performing various functions programmed into the device, and a memory connected to the processor for storing information relating to the vehicle. This information may include, but is not limited to, maintenance history records and information relating to replacement parts of the customized vehicle systems. The device further includes a wiring harness for receiving signals from the vehicle, and a port for receiving information generated by the vehicle's odometer. The device also includes an input/output port for transferring information to and from the device. In operation, the maintenance alert device generates various maintenance signals after the occurrence of predetermined events monitored by the processor.

26 Claims, 3 Drawing Sheets

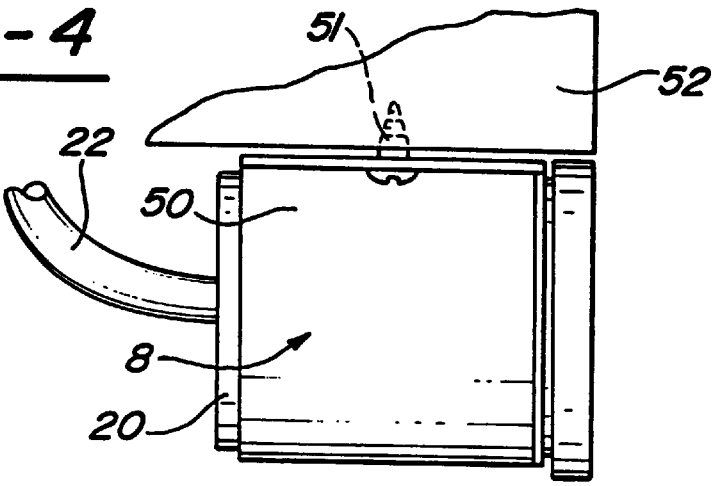
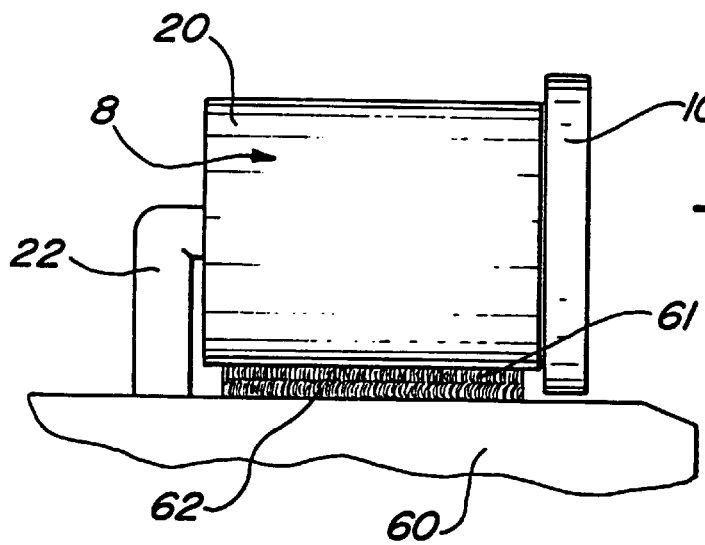
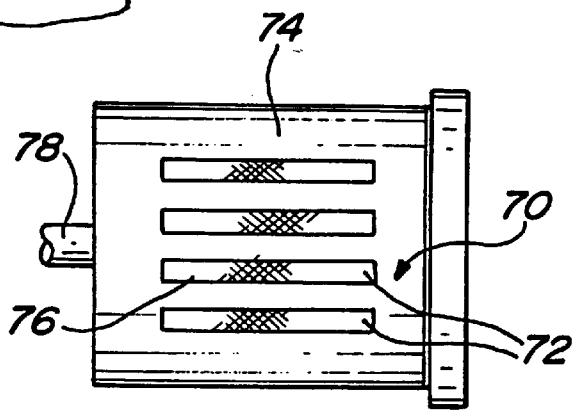

MAINTENANCE ALERT CLUSTER WITH MEMORY

BACKGROUND OF THE INVENTION

1. Technical Field

The present invention relates generally to a maintenance alert device. More specifically, the present invention relates to a maintenance alert device having a memory for storing information relating to a vehicle or machine.

2. Background of the Invention

Many motorized vehicles as well as pieces of stationary equipment have monitoring systems for alerting the operator that something has, or is about to go wrong with one of the components or systems. The warning comes either from the visual inspection of gauges, or from the illumination of warning lights. Some of the common problems include low oil, overheating of the engine, low power from the electrical system, and insufficient brake pressure.

Accordingly, it is advantageous if the operator of the vehicle or machine receives these warnings prior to damage to the vehicle or machine. While it is typically difficult to predict these system failures, regularly scheduled preventative maintenance is the preferred method for avoiding mechanical failure. By performing regular preventative maintenance on the vehicle, the life span of the vehicle can be significantly increased. Additionally, a significant savings can be realized by avoiding the expense of major repairs.

However, with large fleets of vehicles, it becomes more difficult to anticipate when certain vehicles or groups of vehicles will require preventative maintenance. As such, this creates scheduling burdens as well as difficulty in maintaining a consistent replacement part inventory. While one skilled in the art can create a preventative maintenance schedule, this becomes more difficult when the number of customized vehicles in the fleet increases. Additionally, the average vehicle owner may have difficulty in creating a maintenance schedule as well as figuring out problems with various systems after they have occurred. Therefore, a main object of the present invention is to provide an audio/visual means to alert the operator or owner that certain preventative maintenance tasks are required.

Another object of the present invention is to provide a device having memory for storing information relating to the history of the preventative maintenance tasks performed on the vehicle, along with an inventory of replacement parts necessary for completing the preventative maintenance tasks.

Yet another object of the present invention is to provide a maintenance alert device which can transfer this information via any number of communication links to a receiving station or device.

Another object of the present invention is to provide such an alert device that can be installed as original equipment or as an aftermarket retrofit.

Still a further object of the present invention is to provide a preventative maintenance alert which can be installed in or around the dash, for viewing by the vehicle operator, or as a concealed "black box" type device, hidden within the vehicle, which can only be accessed by authorized individuals.

It is a final object of the present invention to provide a maintenance alert device which provides alert information based upon either or both vehicle operating hours and vehicle mileage. Accordingly, this feature allows the present invention to be compatible with both land based vehicles, as well as airplanes and watercraft.

SUMMARY OF THE INVENTION

In accordance with the principles of the present invention, a maintenance alert device having a memory for storing information relating to the vehicle is disclosed. More specifically, a housing is provided for containing the components of the device, which include a processor for performing various functions programmed into the device, and a memory connected to the processor for storing information relating to the vehicle. This information may include, but is not limited to, maintenance history records and information relating to replacement parts associated with the customized vehicle systems. The device further includes a wiring harness for receiving signals from the vehicle, and a port for receiving information generated by the vehicle's odometer. The device also includes an input/output port for transferring information to and from the device. In operation, the maintenance alert device generates various maintenance signals after the occurrence of predetermined events monitored by the processor. These signals include both audio and visual alert signals.

Additional objects, advantages and features of the present invention will become apparent from the following description and appended claims, taken in conjunction with the accompanying drawings.

BRIEF DESCRIPTION OF THE DRAWINGS

FIG. 4 is a fragmentary side elevation of the present invention mounted to the underside of a vehicular dash assembly;

FIG. 5 is a fragmentary side elevation of the present invention employing a hook and loop material for releasably securing the device to the top surface of a vehicular dash assembly;

FIG. 6 is a side elevation of the present invention depicting the means for providing an audio alert;

DETAILED DESCRIPTION OF THE PREFERRED EMBODIMENTS

In accordance with the teachings of the present invention, a maintenance alert system having a memory for storing information relating to the vehicle in which the system is installed is disclosed. In a preferred embodiment, the memory associated with the device stores information relating to the maintenance tasks performed on the vehicle, as well as an inventory of replacement parts for use with the customized systems of the vehicle. The present invention is particularly suited to large fleets of vehicles, such as semi-trucks and trailers, and fleets of specialized service vehicles. Within the trucking industry, many of the vehicles are custom ordered with various independent systems. For example, the owner may select different engine and transmission combinations, depending on whether the truck is primarily used for hauling payloads through flat regions or mountainous regions. Additionally, the truck may be intended for light duty or heavy duty over the road service. The vehicle may also have customized brake systems, exhaust systems and cooling systems, in addition to other more specialized functions, such as alternators and hydraulic and pneumatic pumps driven by the engine. Accordingly, each of these custom-ordered systems requires unique replacement parts. Thus, to maintain a diverse fleet of custom-ordered vehicles, a large variety of replacement parts is required. For example, if the fleet includes thirty different types of engines, a maintenance depot may be required to stock thirty or more different types of oil and air filters as replacement parts. In accordance with the teachings of the present invention, the maintenance alert system assists in recording the maintenance history of each vehicle, as well as alerting a maintenance depot as to which parts they must have in stock prior to completing the preventative maintenance tasks. With particular reference now to the drawings, the structural and functional aspects of the present invention are described with more particular detail.

Figure 1:
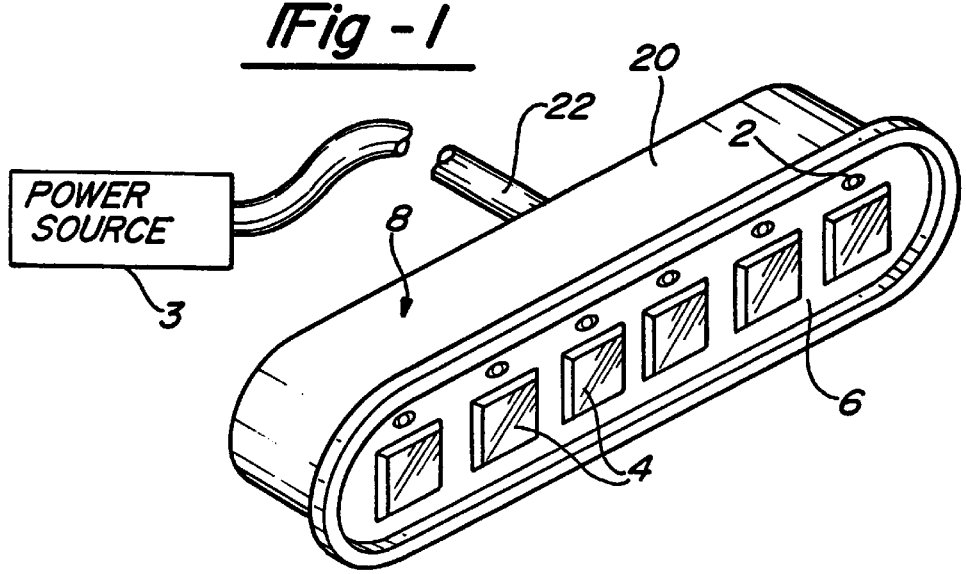
FIG. 1 is a perspective view of the preferred embodiment of the present invention.

With reference to FIGS. 1 through 6, the various features of maintenance alert cluster 8 are illustrated. As seen in FIG. 1, the maintenance alert cluster 8 comprises a face plate 6 having a plurality of light displays 4. Each light display 4 has a designated set of buttons 2 for entering individual data. A wiring harness 22, which exits from the rear of circuit housing 20, can be interconnected to various signal sources within the vehicle.

Figure 2:
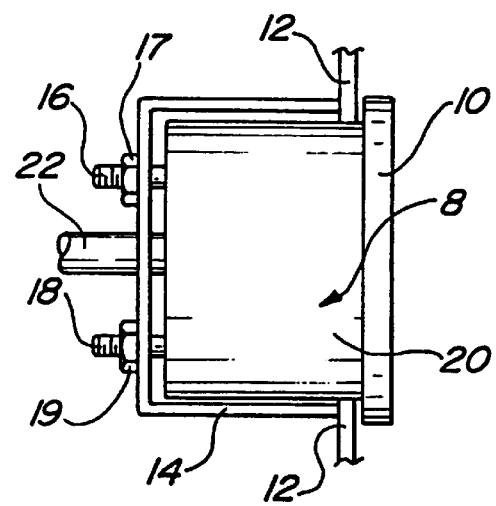
FIG. 2 is a fragmentary side elevation of the present invention as installed in a vehicular instrument panel.

FIG. 2 illustrates the maintenance alert cluster 8 from the side. In this embodiment, a dash panel 12 is bound between the face plate rim 10 and a bracket 14, wherein the face plate rim 10 is drawn to the bracket 14 by tightening a first nut 17 onto a first stud 16, and by tightening a second nut 19 onto a second stud 18, until firmly secured against bracket 14. The circuit housing 20 includes a wiring harness 22 which extends through the bracket 14 to be connected to various signal sources within the vehicle.

Figure 3:
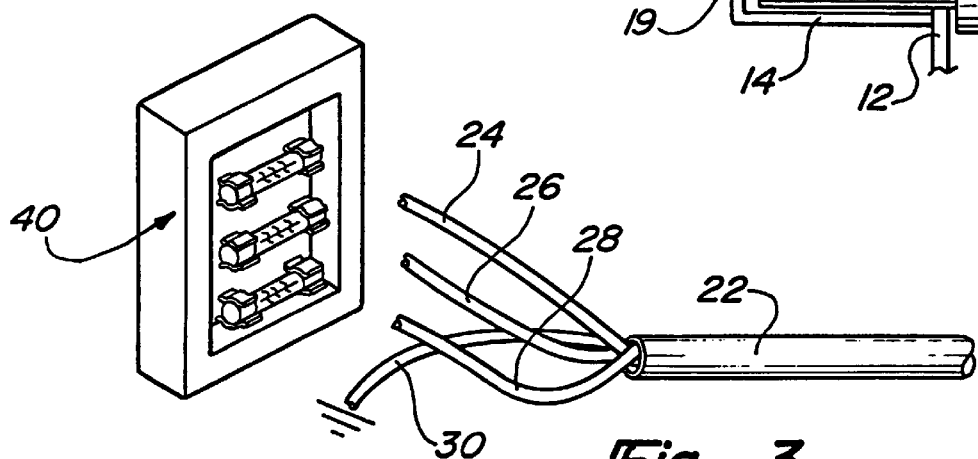
FIG. 3 is a fragmentary perspective view of a common wiring scheme adaptable to the present invention.

FIG. 3 illustrates the wiring harness 22 having a first lead 24 designated "ignition," a second lead 26 designated "battery," a third lead 28 designated "dash lights," and a final lead 30 designated as the ground. As best seen in this Figure, a fuse box 40 is adapted for connection to the leads of wiring harness 22. In operation, ignition lead 24 provides the appropriate signal to the system for determining whether the vehicle is on or off. Thus, this signal can be used for calculating the period of continuous time in which the vehicle has been running. Battery lead 26 provides a constant power source to the maintenance alert system's electrical components while the vehicle is running, as well as power to the maintenance alert system's internal clock when the vehicle is not running. Thus, the maintenance alert system is also capable of calculating elapsed time during maintenance events regardless of whether the vehicle is running. For example, the system can alert the operator to change the engine oil every three months, regardless of the miles the vehicle has traveled. The dash light lead 28 provides a signal so that the maintenance alert system can illuminate its visual display components for better viewing during night operation.

Referring now to FIG. 4, the maintenance alert cluster 8 is illustrated as being mounted to the underside of a dash panel 52 by means of a bracket 50 and a screw 51 for securing the circuit housing 20 to the dash panel 52. FIG. 4 further illustrates that the wiring harness 22 of this embodiment of the maintenance alert cluster 8 extends upwardly behind the dash panel 52.

FIG. 5 illustrates the maintenance alert cluster 8 mounted to the top surface of a dash board 60 by way of a hook 61 and loop 62 fastening system. The hooks 61 are secured to the underside of the circuit housing 20, while the loops 62 are secured to the top surface of the dash 60. When combined, the hook and loop fastening system provides sufficient height for the face plate rim 10 to clear the dash 60. In this embodiment, the wiring harness 22 extends downwardly and through dash 60 for connection to the vehicle's wiring system.

FIG. 6 illustrates another embodiment of the maintenance alert cluster 70 having slots 72 extending laterally through the circuit housing 74 for the transmission of an audio signal. A dust screen 76 is placed over the inside surface of the slots 72 for semi-sealing the circuit housing 74, and for aesthetically concealing the internal components from view. A wiring harness 78 is adapted for extending from the rear of the housing 74 for connection to the vehicle's wiring system. One skilled in the art will appreciate that as disclosed, wiring harness 78 is preferably identical to wiring harness 22.

While the above embodiments of the present invention are well suited to achieve the above stated objects, one skilled in the art will readily recognize that such embodiments can be modified without departing from the spirit and scope of the present invention. For example, the electrical circuitry necessary, but not relied upon, could incorporate a solar cell for providing electrical power to the maintenance alert cluster 8. As another example, the maintenance alert cluster 8 could be adapted to an odometer for preventative alerts based upon mileage in addition to, or in the alternative, to providing maintenance alerts based upon elapsed time.

Figure 7:
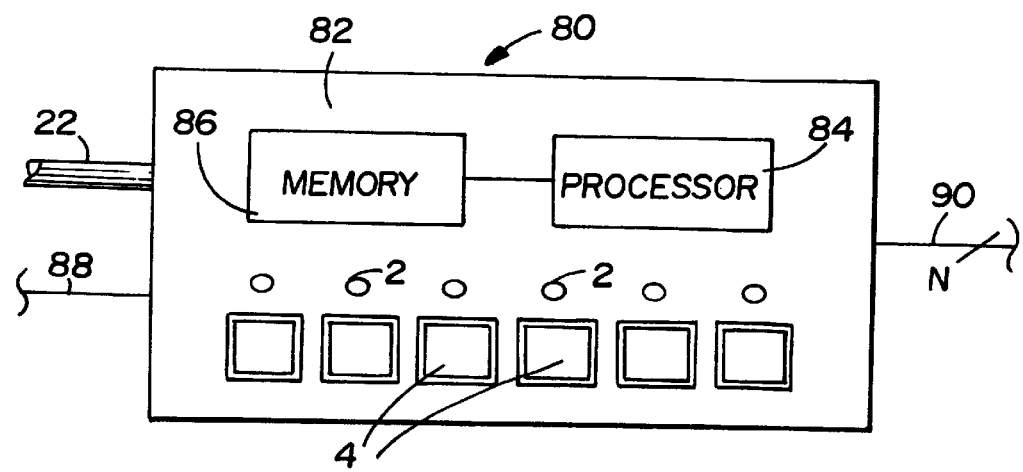
FIG. 7 is a functional block diagram including the electronic processing components and communication ports according to a first embodiment of the present invention.
Figure 8:
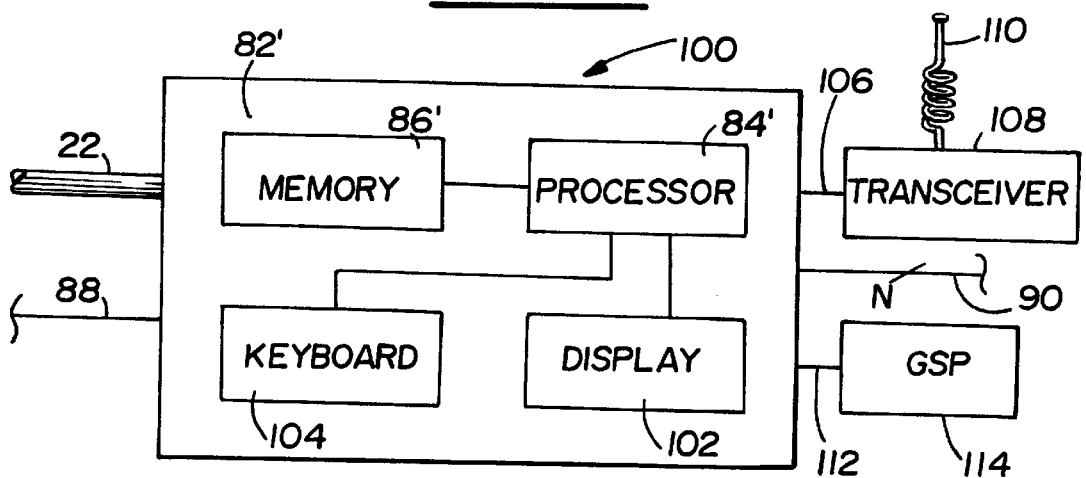
FIG. 8 is a functional block diagram illustrating a second preferred embodiment of the present invention.
Figure 9:
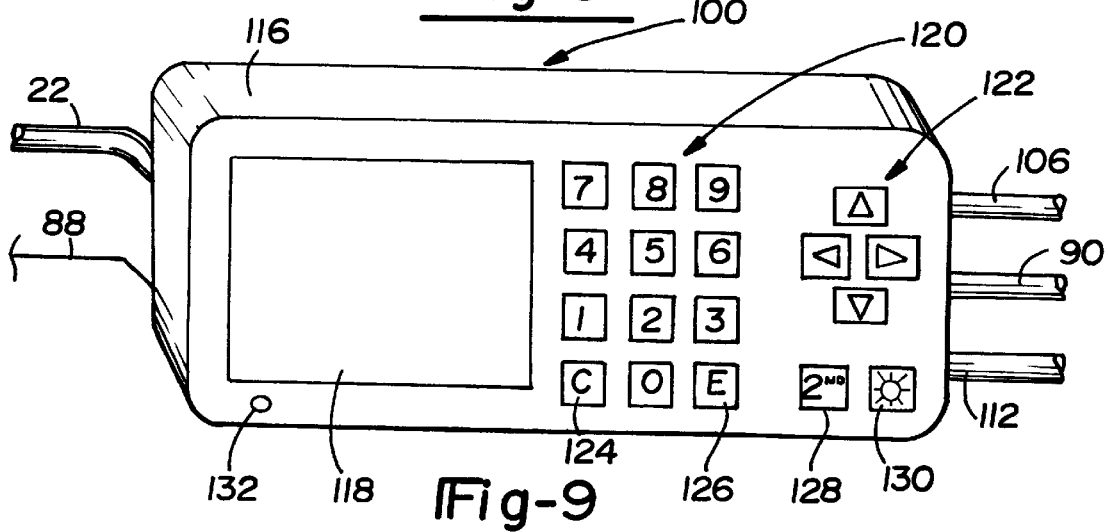
FIG. 9 is a front perspective view of the maintenance alert system according to the preferred embodiment of the present invention.

Turning now to FIGS. 7 through 9, the various embodiments disclosing the maintenance alert system according to the teachings of the present invention are shown in more detail. In a first embodiment, maintenance alert device 80 can be enhanced with several features which make the device particularly suitable for use with custom-ordered vehicles such as semi-trucks and trailers. However, because the maintenance alert device 80 is both distance and time based, the device is also suitable for use with, but not limited to, aircraft and watercraft. Additionally, the maintenance alert device 80 is also suitable for use with stationary equipment, for example, electrical generators.

With reference to FIG. 7, maintenance alert device 80 is illustrated as having various components secured within a circuit housing 82. As with the previously discussed embodiments, the maintenance alert device 80 also includes a wiring harness 22 which connects to the vehicle's electrical system for providing various signals to the device. A plurality of light displays 4 are provided on the front surface of the maintenance alert device 80. Each light display 4 also includes a designated set of buttons 2 for entering individual data into the maintenance alert device 80.

FIG. 7 further illustrates the processor 84 contained within the circuit housing 82 for executing a predetermined set of functions, and applying a set of maintenance schedule rules. These functions and maintenance rules may be stored within a memory 86, preferably a read only memory, which is connected to processor 84. Additionally, these predetermined functions may be programmed into the maintenance alert device using buttons 2, or may alternatively be programmed from a remote terminal via I/O port 90. As disclosed, I/O port 90 can provide a variety of functions to the maintenance alert device 80. For example, maintenance alert signals generated by the processor can be displayed via light displays 4, or sent via I/O port 90 to an external display for presentation to the vehicle operator. Such a display includes, but is not limited to, a display mounted within the vehicle's dashboard, or the display on the face of the vehicle's radio. Additionally, a trained technician may download more detailed information stored within the memory 86 of the maintenance alert cluster 80 into a separate computer. A mileage information port 88 is also provided as part of the maintenance alert device 80 for receiving mileage information generated by the vehicle. This mileage information may be derived from either the vehicle's odometer, or from the vehicle's engine control module. However, one skilled in the art will appreciate that this mileage information can be generated from various other signal sources.

A unique feature associated with maintenance alert device 80 is the type of information stored within memory 86. Memory 86 represents any number of memory architectures including a combination of random access memory and read only memory for storing a variety of information. Preferably, memory 86 stores information relating to the maintenance history of the vehicle in which the maintenance alert device 80 is installed. More specifically, after the maintenance alert device 80 has signaled that a particular maintenance task is required, a record of the detailed maintenance performed on the vehicle to complete the maintenance task can be stored within the memory 86. This information may include such things as the date, technician name and parts which were replaced as part of the particular maintenance task. Additionally, this information may include a notation made by the technician that a particular vehicle system, which was due for inspection, was actually inspected, and did not require service or maintenance at this particular time or mileage interval. Accordingly, a detailed maintenance history can be maintained within memory 86. This information is also useful to verify that the vehicle's warranty has not been invalidated due to a lack of maintenance.

Additionally, memory 86 can also be used to maintain a listing of replacement parts for the systems and components of the vehicle. More specifically, semi-trucks and trailers are typically custom-ordered with various combinations of components, including, but not limited to, engines, transmissions, brakes, cooling systems, and suspension components. As such, these custom-ordered vehicles cannot be maintained with a standardized set of parts. Rather, the maintenance depot must carry a wide variety of replacement parts in order to complete the required maintenance tasks. Accordingly, when the vehicle is manufactured, the inventory of required replacement parts can be programmed into memory 86. When the vehicle is serviced, the technician can download the replacement parts inventory from memory 86 into a receiving terminal via I/O port 90. Alternatively, this information can be displayed on an external terminal as described above.

In operation, when the vehicle pulls in for service, the technician connects a receiving terminal to the maintenance alert device 80 via I/O port 90 for viewing and determining what scheduled maintenance must be performed, what maintenance has been performed in the past, and which parts are required to complete the scheduled maintenance. Upon completing the required tasks, memory 86 is properly updated with the appropriate information.

With a very large fleet of vehicles, it may be desirable to install maintenance alert device 80 as a "black box" device which cannot be accessed or viewed by the vehicle operator. This feature might be particularly advantageous in situations where numerous individuals operate a single vehicle and view the preventative maintenance tasks as an inconvenience. As such, only authorized individuals could inspect the maintenance schedule of the maintenance alert device 80 during time periods when the vehicle is not in use.

With particular reference now to FIGS. 8 and 9, the features associated with the preferred embodiment of the present invention are disclosed in more particular detail. FIG. 8 illustrates the functional components associated with maintenance alert system 100. While operating in a fashion similar to that of maintenance alert device 80, maintenance alert system 100 includes several additional functions to enhance the operation of the system.

Maintenance alert system 100 also includes a processor 84' for executing a predetermined set of maintenance alert functions. A memory 86' is coupled to processor 84' and includes both random access memory and read only memory. As disclosed above, memory 86' performs the identical functions as disclosed by memory 86. Thus, in addition to storing records relating to vehicle maintenance history and an inventory of replacement parts, memory 86' can also be used to store various system programs such as a menu driven interface, communication information, and a directory of maintenance depot locations and phone numbers.

Maintenance alert system 100 also includes a wiring harness 22 for connecting to the vehicle's wiring system, and a mileage information port 88 for receiving mileage information from the vehicle. As an added feature, maintenance alert system 100 further includes a display controller 102 for processing information for presentation on an internal or external display screen. Maintenance alert system 100 also includes a keyboard controller 104 for processing or decoding information received from an internal or external keyboard unit. An I/O port 90 is also provided for sending and receiving information to and from a receiving terminal. As disclosed, the receiving terminal includes, but is not limited to, a computer located at a maintenance depot, or a hand held programming device operated by a service technician.

The maintenance alert system 100 can also be outfitted with various options for enhancing the information provided by the maintenance alert system 100 to the user or vehicle operator. One such option includes a transceiver port 106 for providing bidirectional communication with a transceiver unit 108 which is then connected to an antenna 110 mounted on or within the vehicle. As disclosed, transceiver unit 108 may include a cellular communication link which is capable of sending maintenance or part information relating to the vehicle and stored within memory 86', ahead to a computer located at the maintenance depot. Such a feature allows the maintenance depot to properly schedule the maintenance, service technicians, and insure that the correct replacement parts are located at the maintenance depot. If such maintenance is not possible, the maintenance depot can notify the maintenance alert system 100 that the desired maintenance is not possible, and that the vehicle operator must travel elsewhere for service. Additionally, transceiver unit 108 and processor 84 may send this maintenance or part information via cellular communication to a receiving facsimile machine located within a less advanced maintenance depot.

As an additional option, the maintenance alert system 100 can be provided with a GPS input port 112 for accepting information received from a GPS receiver 114 located within the vehicle. As the use of GPS receivers becomes more widespread, especially within the trucks used for expediting services, it is desirable for the maintenance alert system 100 to calculate the distance to the nearest service depot. This distance can then be translated into a time estimate for the arrival of the vehicle for service. As disclosed, the GPS input port 112 is a standardized NMEA 0183 data interface port, which is the standard used by many of the manufacturers within the GPS receiver industry. Accordingly, the addition of GPS information to the processing algorithm of maintenance alert system 100 also allows the maintenance scheduling process to become fully automated.

Turning now to FIG. 9, the circuit housing 116 of the maintenance alert system, and its external features are described in more detail. Housing 116 includes a display 118 for presenting a variety of data and maintenance alert signals to the vehicle operator or maintenance technician. Preferably, display 118 is an eight line LCD display having a width of 20 characters. However, one skilled in the art will appreciate that a variety of displays, including but not limited to LCD displays and touch-sensitive displays, can be substituted into the maintenance alert system 100. Housing 116 also includes a ten digit numeric keypad 120 for entering data into maintenance alert system 100. A grouping of selection arrows 122 are provided for navigating through the menu driven user interface. Selection arrows 122 can also be used to select particular bits of information associated with performing and updating the maintenance and parts records. A clear key 124 and an enter key 126 are also provided for facilitating use of the menu driven system by the user. Like many keypad based systems, a second function or shift key 128 is provided which then allows any of the keys within housing 116 to be assigned a second preprogrammed or user programmed function. The LCD display 118 can be automatically provided with backlighting which is triggered through dash light lead 28 of wiring harness 22 when the vehicle's lights are turned on. Additionally, the display 118 can be manually illuminated by depressing back light key 130. System housing 116 can also be provided with an outlet 132 for allowing an audible signal generated by a speaker, such as a piezoelectric speaker device.

Maintenance alert system 100 stores similar information within its memory 86', and operates in a similar fashion to maintenance alert device 80. In operation, when the vehicle pulls in for service, the service technician has the ability to connect a receiving terminal to the maintenance alert system 100 via I/O port 90 for viewing and determining what scheduled maintenance must be performed, what maintenance has been performed in the past, and which parts are required to complete the scheduled maintenance. However, the service technician or vehicle operator may also view all of this maintenance history and replacement part information directly on display 118. The various types and levels of information can be accessed using keypad 120 and selection arrows 122 to navigate through some type of menu driven interface. Upon completing the required tasks, memory 86' can be properly updated with the appropriate information relating to the maintenance performed, and new replacement part information if a particular vehicle system was changed. As with accessing the information, memory 86' can be updated through the externally connected receiving terminal via I/O port 90, or directly through the menu driven interface via keypad 120 and selection arrows 122.

From the drawings and above disclosure, it can be appreciated that maintenance alert system 100 provides both audio and visual alert signals to the vehicle operator or a maintenance technician. The maintenance alert system 100 is capable of receiving a plurality of input signals which allows the processor 84' to make decisions as to when maintenance tasks must be performed. The maintenance alert system 100 is also capable of communicating with a maintenance depot via a cellular communication transceiver 108. This communication feature may be enhanced with navigational information received from a GPS receiver 114.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A device for alerting one to perform a preventative maintenance task on a mobile and immobile object in order to extend the life-span thereof, said device comprising:

a housing for containing components associated with the device;

a processor for performing a predetermined set of functions and monitoring operation of the object;

a memory connected to the processor for storing information relating to the mobile and immobile object and for storing a plurality of maintenance rules defining a predetermined event;

a wiring harness for connecting the processor to a plurality of signal sources, wherein at least one of the signal sources provides a signal which can be monitored by the processor for determining a period of continuous time in which the object has been operating;

said processor including an input port for receiving mileage information generated by an odometer; and an input/output port for transferring information to and from the device;

whereby the processor continually applies the maintenance rules against the period of continuous operating time and the mileage information for generating a maintenance alert signal upon the occurrence of the predetermined event.

2. The device of claim 1 wherein the memory includes a read only memory.

3. The device of claim 1 wherein the memory stores a database of maintenance records.

4. The device of claim 1 wherein the memory stores a database of part configuration information.

5. The device of claim 1 further including a display for presenting information generated by the processor.

6. The device of claim 1 further including a keypad for programming the device.

7. The device of claim 1 wherein the odometer information received on the input port is generated by an engine control module.

8. The device of claim 1 further including a menu-driven user interface.

9. The device of claim 5 wherein the display is a touch-sensitive display for presenting a menu-driven user interface and receiving information from a user touching a surface of the display.

10. The device of claim 1 wherein the input/output port communicates via one of a communication cable and an infrared data link to a processing terminal.

11. The device of claim 10 further comprising a transceiver for transferring information stored in the memory to a receiving station.

12. The device of claim 11 wherein the receiving station is a maintenance depot.

13. The device of claim 10 further including a port for receiving information generated by a global positioning satellite receiver.

14. The device of claim 11 wherein the transceiver comprises one of a cellular network transceiver and a pager network transceiver.

15. A device installed within a vehicle for alerting one to perform a preventative maintenance task on the vehicle in order to extend the life span thereof, said device comprising:

a housing for retaining the components associated with the device, the housing including bracket means for mounting the device within the vehicle;

a processor for performing a predetermined set of functions and for making decisions based upon a set of scheduled maintenance rules;

a memory connected to the processor for storing the set of scheduled maintenance rules and information relating to the vehicle, the information including a database of maintenance history records and a database of vehicle replacement part records;

a wiring harness for connecting the processor to a plurality of signal sources;

an input port for receiving mileage information generated by an odometer of the vehicle;

an input/output port for transferring information to and from the device, and wherein said input/output port communicates via one of a communication cable and an infrared data link to a processing terminal;

a display integrated within the housing for presenting information generated by the processor;

a keypad for programming the device and updating at least the database of maintenance history records;

whereby the processor continually monitors the mileage information received from the odometer and elapsed time of operation of the vehicle, and applies the scheduled maintenance rules for generating a maintenance alert signal upon the occurrence of a predetermined event.

16. The device of claim 15 further including a port for receiving information generated by a global positioning satellite receiver.

17. The device of claim 15 wherein at least the database of vehicle maintenance history records is transportable with the vehicle.

18. The device of claim 15 wherein the maintenance alert signal may be generated while the vehicle is being driven by an operator.

19. A method for generating a maintenance schedule for a vehicle comprising the steps of:

providing a maintenance alert device installed within the vehicle for receiving information from a plurality of vehicle signal sources, said maintenance alert device including a processor and a memory for processing said information against a set of predefined maintenance rules stored within said memory for generating the maintenance schedule, and said maintenance alert device including a transceiver for transferring information generated by the maintenance alert device to a receiving station;

providing the memory within the maintenance alert device with a database of vehicle maintenance records;

providing the memory within the maintenance alert device with a database of vehicle part and configuration information;

transmitting the information stored in the maintenance record database and the part and configuration database to the receiving station; and generating a maintenance alert notification at the receiving station based upon the information transmitted from the maintenance alert device for scheduling preventative maintenance of the vehicle.

20. The method of claim 19 further comprising the step of updating the maintenance record database upon completing the scheduled maintenance items.

21. The method of claim 19 wherein the transceiver is a cellular communication device.

22. The method of claim 19 wherein the maintenance alert device further includes a port for receiving information from a global positioning satellite receiver.

23. A device installed within a vehicle for alerting one to perform a preventative maintenance task on the vehicle in order to extend the life span thereof, said device comprising:

a housing for retaining the components associated with the device;

a processor disposed within the device for performing a predetermined set of functions and for making decisions based upon a set of scheduled maintenance rules;

a memory disposed within the device and connected to the processor for storing the set of scheduled maintenance rules and information relating to the vehicle, the information including a database of maintenance history records and a database of vehicle replacement part records;

a wiring harness for connecting the processor to a plurality of signal sources;

an input port for receiving mileage information generated by an odometer of the vehicle;

a display for presenting information generated by the processor; and a keypad for interrogating the information stored within the memory and updating at least the database of maintenance history records;

whereby the processor continually monitors the mileage information received from the odometer and elapsed time of operation of the vehicle, and applies the scheduled maintenance rules for generating a maintenance alert signal upon the occurrence of a predetermined event.

24. The device of claim 23 further comprising an input/output port for transferring information to and from the device which communicates via one of a communication cable and an infrared data link to a processing terminal.

25. The device of claim 24 wherein at least the database of maintenance history records is transportable with the vehicle.

26. The device of claim 24 wherein the maintenance alert signal may be generated while the vehicle is being driven by an operator.

* * * * *